United States Patent [19]

Hill et al.

[11] 4,176,854
[45] Dec. 4, 1979

[54] CONNECTION FACILITATING HITCH

[76] Inventors: Wayland W. Hill, P.O. Box 168, Earlimart, Calif. 93319; Gary L. Hill, 1408 Demare St., Visalia, Calif. 93277

[21] Appl. No.: 916,803

[22] Filed: Jun. 19, 1978

[51] Int. Cl.$^2$ .............................................. B60D 1/00
[52] U.S. Cl. ................................................. 280/478 R
[58] Field of Search ........... 280/478 R, 478 A, 478 B, 280/491 A

[56] References Cited

U.S. PATENT DOCUMENTS

| | | | |
|---|---|---|---|
| 3,126,210 | 3/1964 | Hill .................................. | 280/478 R |
| 3,169,028 | 2/1965 | Scrivner ........................... | 280/478 R |
| 3,266,818 | 8/1966 | Hill et al. ......................... | 280/478 R |
| 3,912,119 | 10/1975 | Hill et al. ......................... | 280/478 A |

*Primary Examiner*—John A. Pekar
*Attorney, Agent, or Firm*—Huebner & Worrel

[57] ABSTRACT

A hitch for use in coupling a trailer to a towing vehicle characterized by a housing having bottom and top plates disposed in mutually spaced parallelism and a pair of converging side walls defining on opposite sides of the housing a first and a second throat disposed in coaxial alignment, said first throat being of a width dimension less than the width dimension of the second throat, an extensible link comprising a coupling arm seated between said plates having a width dimension slightly less than the width dimension of the first throat and projected from the second throat, a slot of a keyhole configuration comprising an elongated segment terminating in a bore, a retainer pin normally related to the plates and extended through the slot supporting the link for displacement to a retracted position wherein said link is extended through the first throat, and a cylindrical interlocking bolt integrally related to the retainer pin and configured to be inserted into the bore when the link is displaced to its retracted position for securing the link against displacement from its retracted position, whereby the link is supported against both axial and pivotal displacement.

5 Claims, 6 Drawing Figures

CONNECTION FACILITATING HITCH

BACKGROUND OF THE INVENTION

1. Field of the Invention

The invention generally relates to hitches for coupling trailers and the like to towing vehicles such as trucks, automobiles and the like, and more particularly to an improved trailer hitch characterized by a coupling arm which facilitates an expeditious coupling of a trailer with a non-aligned towing vehicle.

2. Description of the Prior Art

In the prior art, of course, it is well recognized that difficulty often is encountered in mating opposed portions of a hitch and the like in the event a non-aligned combination for the portions is in operation encountered. The prior art includes numerous devices particularly adapted for use in coupling a trailer, herein referred to as a towed vehicle, with a powered vehicle, herein referred to as a towing vehicle, even though a non-aligned condition exists for the vehicles, and then the opposed portions of the hitch being employed. Typifying such hitches are those disclosed in U.S. Letters Pat. Nos. 3,912,119; 3,126,210; and 3,266,818. However, even though the hithces of the prior art tend to function quite satisfactorily for their intended purposes, it is noted that designers of hitches continuously seek to reduce cost and complexity while increasing utility and reliability of the hitches.

It will, of course, be fully appreciated that in order to increase the utility of a hitch it is highly desirable to increase the ease with which the hitch is used in coupling a towed vehicle to a towing vehicle. Additionally, it is important that a sacrificing of cost reduction and reliability simply to increase the ease with which the hitch is employed be avoided where possible.

It is, therefore, the general purpose of the instant invention to provide an improved hitch characterized by a pivotal coupling arm for accommodating vehicle non-alignment and an improved mechanism for arresting motion of the arm, whereby utility of the hitch is enhanced without sacrificing cost and reliability.

OBJECTS AND SUMMARY OF THE INVENTION

It is, therefore, an object of the instant invention to provide an improved hitch for a towed vehicle.

It is another object to provide in a hitch characterized by a pivotal coupling arm an improved mechanism for capturing the arm and thereafter supporting the arm in a retracted, towing configuration.

It is another object to provide in a hitch characterized by a displaceable coupling arm responsive to the motion of the arm for capturing the arm and supporting it in a retracted towing configuration.

Another object is to provide an improved hitch adapted to be mounted on a towed vehicle for connecting the towed vehicle to a non-aligned towing vehicle, although not necessarily restricted in use thereto since the hitch can be employed equally as well when mounted on the towing vehicle and employed for connecting the towing vehicle to a non-aligned towed vehicle.

These and other objects and advantages are achieved through the use of a hitch characterized by an arm supported by a pin-and-slot coupling for pivotal displacement as well as rectilinear displacement between extended and retracted dispositions, and means for securing the arm against displacement including a bolt receiver comprising a bore defined in the arm adjacent to the slot, and a locking bolt disposed in coaxial alignment with the bore when the arm is in a retracted position, a cam follower surface defined in the arm for engaging the bolt as the arm is retracted, whereby the arm is positioned for establishing coaxial alignment between the bore and the bolt, and a bolt actuator for driving the bolt into the bore as coaxial alignment occurs, as will become more readily apparent by reference to the following description and claims in light of the accompanying drawings.

DESCRIPTION OF THE PREFERRED EMBODIMENT

Figure 1:
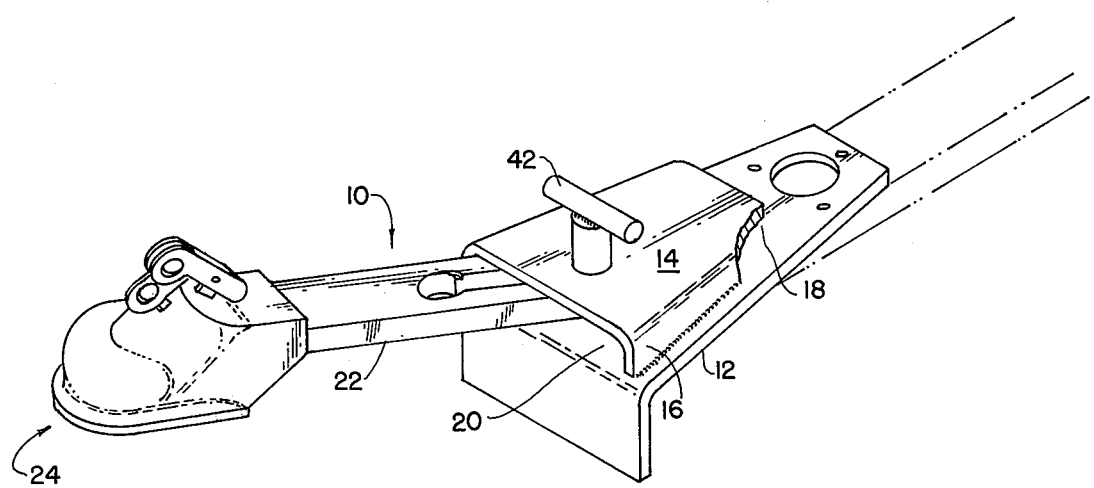
FIG. 1 is a perspective view of a hitch which embodies the principles of the instant invention having a coupling arm depicted in an extended disposition.

Referring now to the drawings wherein like reference characters designated like or corresponding parts throughout the several views there is shown in FIG. 1 a hitch, generally designated 10, which embodies the principles of the instant invention.

The hitch, as shown in FIG. 1, includes a bottom plate 12 configured to be received at the leading end of a trailer or similar towed vehicle. As illustrated, the bottom plate 12 is configured to be mounted at the apex of a conventional A frame of the type frequently provided for so called house trailers, mobile homes and the like. However, it should be apparent that the bottom plate 12 is configured to be mounted on the tongue of conventional trailers, and, where desired, on the bumpers of towing vehicles such as pickup trucks and the like. Therefore, the particular configuration of the bottom plate 12 is dictated, at least in part, by the environment in which the hitch is to be employed and is varied as desired.

However, it is important to note that the hitch 10 also includes a cover plate 14 of a truncated triangular configuration. The cover plate 14, as shown, is of an integrated construction and includes downturned or vertical side walls 16 extended in converging directions. Between the side walls, between adjacent ends thereof, there is formed a first throat 18 and a second throat 20. The throat 20 is characterized by a width dimension greater than the dimension of the first throat 18.

Projected from the first throat 18 there is a coupling arm 22 having a ball-hitch receiver 24 disposed at its extended end. Again, it is to be understood that while a ball-hitch receiver is shown, it can readily be appreciated that the particular configuration of the receiver is varied as desired. For example, a clevis can be provided at the extended end of the coupling 22, where so desired, without departing from the spirit of the invention.

Figure 6:
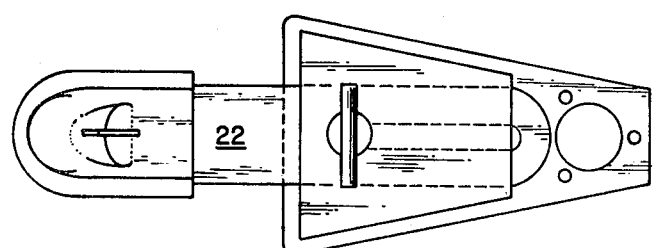
FIG. 6 is a top plan view of the hitch illustrating the arm in a retracted, towing configuration.

It is important to note that, as best illustrated in FIG. 6, the coupling arm 22 is supported to be extended to a coupling configuration and subsequently retracted to a towing configuration. Moreover, the arm 22 is of a length such that it projects from the first throat 18 as well as the second throat 20 when the arm is fully retracted to its towing configuration. Consequently, the width dimension of the coupling arm 22 is slightly less than the width dimension of the throat 18 whereby extension and retraction of the arm relative to the throat is accommodated.

Figure 2:
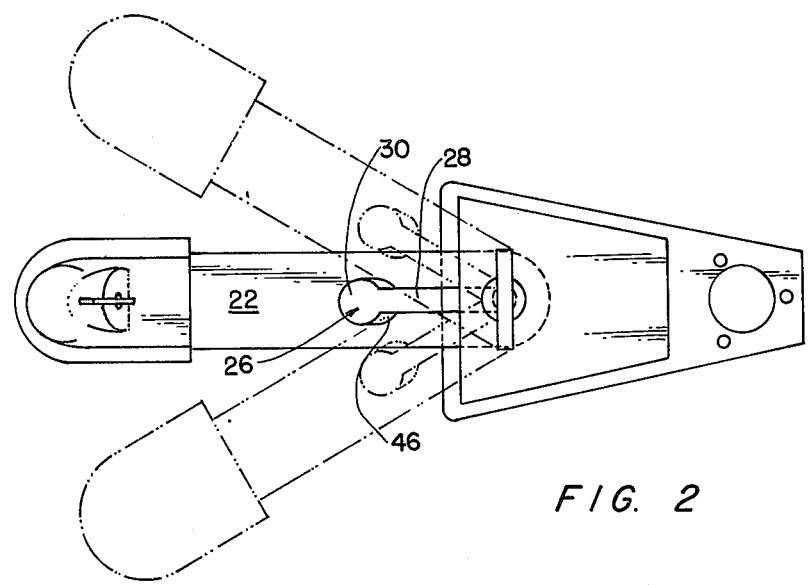
FIG. 2 is a top plan view of the hitch depicting alternate pivotal positions for the arm.

Extended along the center portion of the coupling arm 22 is a slot 26, best illustrated in FIG. 2. The slot 26 includes a linear segment 28 which terminates in a cylindrical bore 30 for thus imparting thereto a keyhole configuration.

Figure 3:
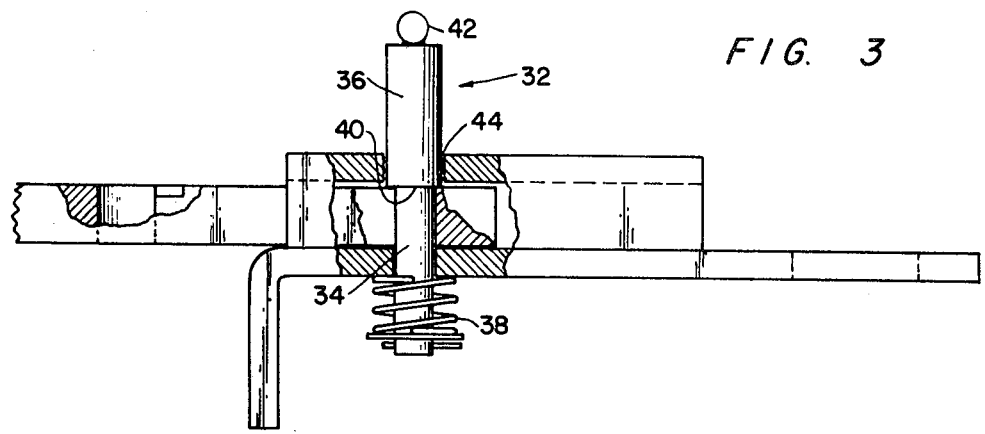
FIG. 3 is a partially sectioned, fragmented side elevational view of the hitch illustrating the arm in its extended disposition.
Figure 4:
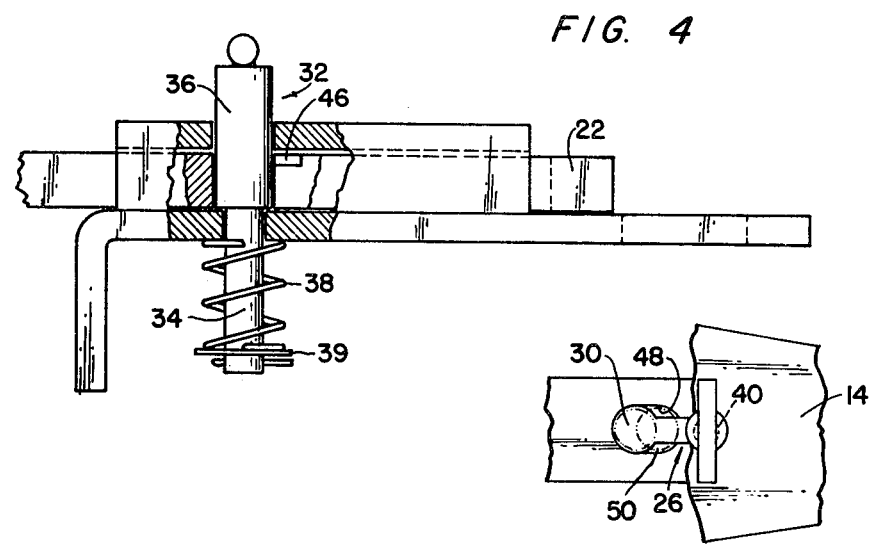
FIG. 4 is a partially sectioned, fragmented, side elevational view illustrating the arm in its retracted disposition.
Figure 5:
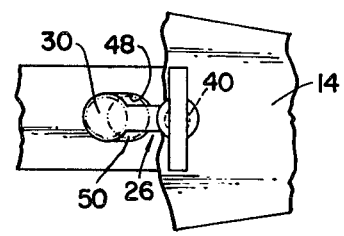
FIG. 5 is a fragmented top plan view of a portion of the hitch illustrating the effect of positioning means provided for maintaining alignment of the arm as a retraction thereof occurs.

With particular reference to FIGS. 3 and 4, it can be seen that the coupling arm 22 is connected to the plates 12 and 14 through a use of a spring-loaded pin assembly, generally designated 32. The pin assembly 32, as shown, includes a segmented, axially displaceable shaft having a first segment comprising a retainer pin 34 and a second segment comprising a locking bolt 36 of a cylindrical configuration. As shown, the retainer pin 34 is of a diameter slightly less than the diameter of the segment 28 of the slot 26, while the locking bolt 36 is characterized by a diameter somewhat greater than the diameter of the retainer pin but slightly less than the diameter of the bore 30. Consequently, the retainer pin 34 is afforded passage through the keyhole slot 26, along the entirety of its length, while passage of the locking bolt 36 through the arm is limited to the bore 30, as best illustrated in FIGS. 3, 4 and 5.

At this juncture, it is important to appreciate that the retainer pin 34 affords pivotal displacement of the arm 22 as well as to function as a guide for the arm as it is extended and retracted relative to the throats 18 and 20. Additionally, the retainer pin 34 serves to afford a coupling of a helical compression spring 38 to the pin assembly 32 for purposes of imparting a spring-load thereto. The spring 38 is concentrically related to an end portion of the retainer pin 34 and is interposed between a keeper 39 affixed to the pin 34 and the bottom surface of the plate 12. Hence, it should be appreciated that the spring 38 continuously applies a retracting force to the retainer pin 34 for continuously urging the pin downwardly, as viewed in the drawings.

It is also important to note that between the adjacent segments of the shaft forming the retainer pin 34 and the locking bolt 36 there is an annular surface 40 extended radially relative to the longitudinal axis of the locking bolt. The annular surface 40, in effect, functions as a bearing surface for restraining the locking bolt 36 from displacement in response to the applied forces of the spring 38. Thus, the annular surface 40 simply slides along the top surface of the arm 22 as the coupling arm 22 is displaced. As a practical matter, to the upper extremity of the locking bolt 36, as viewed in the drawings, there is a T-handle 42 which permits the locking bolt 36 to be elevated against the applied forces of the spring 38. The purpose of accommodating elevational displacement of the locking bolt is to accommodate a release of the arm 22, as will hereinafter become more readily apparent.

As best shown in FIGS. 3 and 4, the cover plate 14 is provided with a cylindrical aperture 44 through which the locking bolt 36 projects. The diameter of the aperture 44 is slightly greater than the diameter of the locking bolt 36 whereby the surfaces of the aperture serve to guide the locking bolt as reciprocating motion is imparted thereto.

As should now be apparent, as the coupling arm 22 is retracted toward its towing configuration, illustrated in FIG. 6, the inner surfaces of the side walls 16 engage the adjacent end of the coupling arm 22 and urge it toward the center-line of the throat 18. Thus the coupling arm is caused to pass through the throat 18, as retracting displacement is imparted thereto. Simultaneously, the retainer pin 34, as it is centered with the slot 26, serves as a centering pin for the trailing portion of the arm 22 as the arm is retracted, relative to the throat 20.

Continued retraction of the arm 22 to a fully retracted towing configuration, of course, causes the bore 30 to move toward alignment with the locking bolt 36. However, in order to assure that coaxial alignment is achieved between the bolt 36 and the bore 30, the upper surface of the arm 22 is provided with a camming relief 46. This relief is of a diameter substantially equal to the diameter of the locking bolt 36 and includes a curved wall surface 48, FIG. 5, generally symmetrically related to the slot 26 and terminates in the surfaces of the bore 30. Additionally, the relief 46 is provided with a bottom bearing surface 50 upon which the annular surface 40 is permitted to ride once the locking bolt 36 is caused to enter the relief 46 under the influence of the spring 38.

The curved surface 48, as depicted in FIG. 5, rides against the cylindrical surface of the locking bolt 36 and thus the mated surfaces of locking bolt 36 and the relief 46 function as cam and cam follower surfaces for purposes of assuring that coaxial alignment is established between the bore 30 and the locking bolt 36 as the coupling arm 22 is retracted into a fully retracted towing disposition. Of course, once coaxial alignment is achieved between the locking bolt 36 and the bore 30 the spring 38, acting against the keeper 39, causes the locking bolt 36 to advance into a fully seated relationship with the bore 30. Thus the coupling arm 22 is secured against linear displacement, relative to the plates 12 and 14 of the hitch, until the locking bolt 36 is extracted from the bore 30 for effecting a release of the arm 22. In order to extract the bolt 36 from the bore 30, and thus release the arm 22 for displacement, the T-handle 42 is grasped and the locking bolt 36 lifted from the bore 30 in a simple manual operation.

OPERATION

It is believed that in view of the foregoing description, the operation of the hitch 10 will readily be understood and it will be briefly reviewed at this point.

With the hitch 10 assembled in the manner hereinbefore described, and mounted at the forward end of a towed vehicle, such as a house trailer or the like, the ball-hitch receiver 24 is readily positioned to receive the ball, not shown, of a ball-hitch mounted on a towing vehicle, such as on the bumper of a pickup truck, automobile or the like. Such positioning of the receiver 24 is facilitated due to the fact that pivotal motion and axial extension of the arm 22 is accommodated as the retainer pin 34 is permitted to advance, relative to the slot 26. Of course, so long as the annular surface 40 of the locking bolt 36 rides along the upper surface of the coupling arm 22 the arm 22 may be extended, retracted and/or pivotally displaced in directions suitable for positioning the receiver 24 to receive the ball of the ball-hitch. Once the receiver 24 is positioned to receive the ball of the ball-hitch the ball is inserted into the receiver in a conventional manner. The operator of the towing vehicle now moves the towing vehicle in a direction such that the arm 22 is forced to move in a retracting direction, relative to the hitch 10. As retraction of the arm 22 occurs, the side wall 16 of the hitch forces the arm 22 toward a coaxial aligned relationship with the first throat 18, while the opposite end of the arm 22 is centered by the retainer pin 34 riding in the linear segment 28 of the slot 26.

Continued retraction of the arm 22 causes the relief 46 to be positioned beneath the annular surface 40 of the locking bolt 36. Once this positional relationship is established between the relief and the locking bolt, the locking bolt 36 "drops" into the relief 46 whereupon the annular surface 40 of the bolt is permitted to ride along the curved surface 48 of the relief. As additional retraction is imparted to the coupling arm 22 the surfaces of the relief and the locking bolt cooperate to guide the arm in a manner such that coaxial alignment is established between the bore 30 and the locking bolt 36.

Once coaxial alignment is achieved between the bore 30 and the locking bolt 36 the spring 38 of the spring-loaded pin assembly 32 acting on the locking bolt 36, through the pin 34, draws the locking bolt 36 into the bore 30 for thus establishing the coupled relationship with the locking bolt and arm 22. Additionally, it should be appreciated that the end portion of the coupling arm 22 extended through the throat 18 is confined against pivotal displacement due to an engagement thereof by the side walls 16. Hence, the coupling arm 22 achieves a substantially fixed relationship with the plates 12 and 14 and the coupling arm 22 is thus secured in its towing configuration. Release of the locking pin 36, relative to the coupling arm 22, is achieved simply by grasping the T-handle 42 and lifting the locking bolt through a distance sufficient to extract the locking bolt from the bore 30, whereby the arm 22 is released for both pivotal and axial displacement.

In view of the foregoing, it should readily be apparent that the hitch 10 provides a practical solution to the problem of achieving increased utility, efficiency and reliability for hitches particularly suited for use in coupling house trailers and the like with towing vehicles such as pickup trucks, automobiles and the like.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. In a hitch characterized by a housing having a horizontally oriented bottom plate, a horizontally oriented top plate, a horizontally oriented throat and a displaceable coupling arm extended axially from the throat, the improvement comprising:
   A. means connecting said arm to said housing supporting the arm for displacement in axial directions from an extended position to a retracted position and for pivotal displacement in directions transversely related to said axial directions including an elongated slot defined in said arm and a retainer pin extended vertically through the slot;
   B. means for securing said arm against axial displacement from said retracted position including a bolt receiver comprising a bore defined in the arm in communicating relation with the slot, and a locking bolt integrally related to said retainer pin characterized by a cylindrical wall surface defining a cam surface and an annular bearing surface concentrically related to said bolt, said bolt being adapted to be disposed in coaxial alignment with said bore when the arm is in said retracted position, guide means for establishing coaxial alignment between said bore and said bolt as the arm is displaced toward said retracted position including a relief having a vertical wall defining a cam follower surface for engaging said cam surface, whereby the arm is laterally positioned relative to the bolt as the arm is retracted, and a planar bottom surface for engaging said bearing surface, and a bolt actuator for driving said bolt into said bore in response to the bore being positioned in coaxial alignment with said bolt; and
   C. means for securing said link against pivotal displacement including means defining in said housing a second throat disposed in coaxial alignment with said first throat for receiving in confining relation an end portion of the arm.

2. The improvement of claim 1 wherein said bore is of a cylindrical configuration and includes a wall segment coincident with an end wall segment of said slot.

3. The improvement of claim 1 wherein said bolt actuator comprises a helical spring member attached to said retainer pin.

4. The improvement of claim 1 further comprising means defining in said housing a guide including vertically disposed, horizontally converging surfaces for aligning said arm in coaxial alignment with said second throat as axial displacement is imparted to the arm.

5. A hitch for use in coupling a trailer to a towing vehicle comprising:
   A. a housing including a bottom plate, a top plate disposed in spaced parallelism with the bottom plate and a pair of converging side walls defining at opposite sides of the housing a first and a second throat disposed in coaxial alignment, said first throat being of a width dimension less than the width dimension of the second throat;
   B. a displaceable coupling arm seated between said plates having a width dimension slightly less than the width dimension of said first throat and projected from the second throat;
   C. means for coupling said arm to said housing and supporting the arm for axial displacement between extended and retracted positions and pivotal displacement in directions transversely related to said axial displacement including means defining in said arm a slot of a substantially keyhole configuration comprising an elongated segment terminating in a cylindrical bore, a retainer pin normally related to said plate and extended through said slot for supporting said arm for said axial and pivotal displacement;
   D. means for securing said arm against both axial and pivotal displacement including an axially displaceable locking bolt integrally related to said retainer pin in coaxial alignment therewith adapted to be disposed in coaxial alignment with said cylindrical bore when said arm is displaced to its retracted position and configured to be inserted into said bore in response to axial displacement imparted thereto, and actuator means connected to said bolt for imparting thereto axial displacement, said bore being spaced from the end of the arm nearest the first throat a distance greater than the distance of the spacing of the bolt from said first throat, whereby said arm is caused to extend through the first throat when the arm is displaced to its retracted position; and E. guide means for guiding said bore into coaxial alignment with said bolt as the arm is displaced to its retracted position including a relief having a cam follower surface disposed in juxtaposition with said bore for receiving said bolt in engaged relation therewith for repositioning the arm in directions transverse to the axis thereof as the arm is displaced toward its retracted position.

* * * * *